(12) United States Patent
George

(10) Patent No.: US 7,120,312 B2
(45) Date of Patent: Oct. 10, 2006

(54) SYSTEM FOR RECOVERY OF DEGRADED IMAGES

(76) Inventor: Nicholas George, 24 Widewaters La., Pittsford, NY (US) 14534

( * ) Notice: Subject to any disclaimer, the term of this patent is extended or adjusted under 35 U.S.C. 154(b) by 353 days.

(21) Appl. No.: 10/205,774

(22) Filed: Jul. 26, 2002

(65) Prior Publication Data

US 2003/0068095 A1    Apr. 10, 2003

Related U.S. Application Data

(63) Continuation of application No. 09/259,774, filed on Mar. 1, 1999, now Pat. No. 6,459,818.

(51) Int. Cl.
*G06K 9/36* (2006.01)
(52) U.S. Cl. ........................... 382/280; 382/254
(58) Field of Classification Search ................ 382/254, 382/260–266, 267–269; 358/254, 260–266, 358/1.9, 2.1
See application file for complete search history.

(56) References Cited

U.S. PATENT DOCUMENTS

| | | | | |
|---|---|---|---|---|
| 4,918,633 | A | 4/1990 | Sullivan | 364/574 |
| 5,453,844 | A | 9/1995 | George et al. | 358/426 |
| 5,523,568 | A | 6/1996 | Ichikawa et al. | 250/310 |
| 5,576,548 | A | 11/1996 | Clarke et al. | 350/369 |
| 5,627,918 | A | 5/1997 | Carasso | 358/254 |
| 5,879,284 | A | 3/1999 | Tsujita | 600/109 |
| 6,459,818 | B1 * | 10/2002 | George | 382/254 |

OTHER PUBLICATIONS

H.W. Babcock, The Possibility of Compensating Astronomical Seeing, Publications of the Astronomical Society of the Pacific, vol. 65, No. 386, pp. 229-236, 1953.

R.K. Tyson, Principals of Adaptive Optics, Academic Press, San Diego, 1991.

(Continued)

*Primary Examiner*—Thomas D. Lee
*Assistant Examiner*—Stephen Brinich
(74) *Attorney, Agent, or Firm*—Berkeley Law and Technology Group, LLC

(57) ABSTRACT

A system for recovering degraded images captured through atmospheric turbulence, or other atmospheric inhomogeneities, such as snow, rain, smoke, fog, or underwater fluctuations, is provided having an imager for capturing through such turbulence both a degraded image of a scene having at least one object, and an image of a point source associated with the object. The imager converts the degraded image into first image data signals representing the degraded image, and converts the image of the point source into second image data signals representing a point spread function. A computer of the system receives the first and second image data signals and produces third image data signals representing a recovered image of the object of the degraded image in accordance with the first and second image data signals. In another embodiment, the imager captures a degraded image through atmospheric turbulence of a scene having a known reference object and an unknown object, and converts the degraded image into first image data signals. After receiving the first image data signals, the computer identifies in the first image data signals such image data signals representing the reference object. The computer produces image data signals representing a recovered image of the degraded image in accordance with the first image data signals, the image data signals representing the reference in the first image data signals, and image data signals representing an undegraded image of the reference. The computer may output the image data signals representing a recovered image to an output device to display or print the recovered image.

9 Claims, 11 Drawing Sheets

OTHER PUBLICATIONS

A. Labeyrie, Attainment of Diffraction Limited Resolution in Large Telescopes, Astronomy and Astrophysics, vol. 6, pp. 85-87, 1970.

J.C. Dainty, Diffraction-Limited Imaging of Stellar Objects Using Telescopes of Low Optical Quality, Optics Communications, vol. 7, No. 2, pp. 129-134, 1973.

Keith T. Knox & Brian J. Thompson, Recovery of Images From Atmospherically Degraded Short-Exposure Photographs, Astrophysical Journal, vol. 193, pp. L45-L48, 1974.

F. Roddier, The effects of atmospheric turbulences in optical astronomy, in: Progress in Optics XIX, North-Holland, Amsterdam, pp. 283-369, 1981.

David J. Lee, Michael C. Roggemann, Byron M. Welsh, & Erin R. Crosby, Evaluation of least-squares phase-diversity technique for space telescope wave-front sensing, Applied Optics, vol. 36, No. 35, pp. 9186-9197, 1997.

M.C. Roggemann, and B. Welsh, Imaging Through Turbulence, CRC Press, Boca Raton, 1996.

B.R. Frieden, An exact, linear solution to the problem of imaging through turbulence, Optical Communications, vol. 150, pp. 15-21, 1998.

Bryan J. Stossel, Nicholas George, Multiple-point impulse responses: controlled blurring and recovery, Optical Communications, vol. 121, pp. 156-165, 1995.

Using Skylight Atmospheric Imaging Simulation for Optical Engineering and Image Science, user manual for Skylight software version 1.21, sold by Twinklesoft, Pasadena California, 1998.

Thomas Goldring & Lawrence Carlson, Analysis and implementation of non-Kolmogorov phase screens appropriate to structured environments, SPIE, vol. 1060, pp. 244-254, 1989.

D.L. Fried, Statistics of a Geometric Representation of Wavefront Distortion, J. Opt. Soc. AM., vol. 55, No. 11, pp. 1427-1435, 1965.

D.L. Fried, Limiting Resolution Looking Down Through the Atmosphere, J. Opt. Soc. AM., vol. 56, No. 10, pp. 1380-1384, 1966.

A.N. Kolmogoroff, The Local Structure of Turbulence in Incompressible Viscous Fluid for Very Large Reynold's Nos., Wiley Interscience, New York, pp. 151-155, 1961.

* cited by examiner

US 7,120,312 B2

SYSTEM FOR RECOVERY OF DEGRADED IMAGES

This application is a continuation of U.S. patent application Ser. No. 09/259,774, filed Mar. 1, 1999, now U.S. Pat. No. 6,459,818, issued Oct. 1, 2002.

The U.S. Government has rights in this invention pursuant to contract DAAG55-97-1-0350 between the Department of the Army and the University of Rochester.

FIELD OF THE INVENTION

The present invention relates to a system (and method) for recovery of degraded images, and relates particularly to, a system for recovery of degraded or blurred digital images captured through atmospheric turbulence, or other obscurations, such as fog, smoke, snow, rain, or underwater fluctuations, using a reference point source or object in each captured image. The invention is especially suitable for improving the quality of images in poor weather conditions.

BACKGROUND OF THE INVENTION

Typically, atmospheric turbulence, such as caused by the weather, can cause degradation in the quality of images taken by telescopes and cameras. Several approaches have been used to deal with the problem of imaging through turbulence. In the area of astronomy, adaptive optics correct each frame by sensing the wavefront distortion induced by the turbulence and providing a servo-controlled phase screen, often referred to as a rubber-mirror. The use of such adaptive optics is described, for example, in H. W. Babcock, Publ. Astron. Soc. Pac. 65 (1953) 229, and R. K. Tyson, PRINCIPALS OF ADAPTIVE OPTICS, 1991. Imaging systems using adaptive optics to correct for atmospheric turbulence are complex and expensive.

Another approach for imaging through turbulence is speckle interferometry. Using a large sequence of frames taken at short exposure times through a telescope, the effect of atmospheric turbulence are reduced by processing the frames through Fourier transforms. Speckle interferometry is described, for example, in A. Labeyrie, Astron. Astrophys. 6 (1970) 85, K. T. Knox et al., "Recovery of Images from Atmospherically Degraded Short-Exposure Photographs," Astrophys. J. 1993 (1974) L45, and F. Roddier, The effects of atmospheric turbulences in optical astronomy, in: Process in Optics XIX, 1981.

More recently, digital processing techniques are being used to correct images for atmospheric turbulence. In an article by B. R. Frieden, "An exact, linear solution to the problem of imaging through turbulence," Opt. Comm. 150 (1998) 15, a sequence of two short-exposure intensity images is taken without any reference point sources, and the images are Fourier transformed and divided by linear equations based on two random point spread functions. The result is inverse filtered to provide an image of an object. One problem with this method is that the point spread function associated with the turbulence is not known in an image due to the lack of any reference, which can cause difficulty in recovering an image taken through turbulence. Accordingly, it would be desirable to more accurately recover degraded images by using a reference point source or object in each image captured, which can be used to characterize the atmospheric turbulence as a point spread function.

In the area of digital image coding and compression, digital images may be processed as described in U.S. Pat. No. 5,453,844 using a random blurring function consisting of numerous, irregularly spaced delta functions. The patent provides for secure transmission of coded images.

SUMMARY OF THE INVENTION

It is the principal object of the present invention to provide an improved system for recovery of degraded images captured through atmospheric turbulence or other turbulent media, which is less expensive than the prior art adaptive optical systems.

Another object of the present invention is to provide an improved system for recovery of degraded images by imaging a reference point source in each of the degraded images.

A further object of the present invention is to provide an improved system for recovery of degraded images in which a reference object in the degraded image is used to recover the image of an unknown object.

A still further object of the present invention is to provide for an improved system for recovery of degraded images in which images can be recovered in approximately real-time.

Briefly described, the system embodying the present invention includes an imager for capturing through atmospheric turbulence, or other turbulent media, a degraded image of a scene having at least one object, and an image of a point source associated with the object. The point source may be provided by a laser which produces a beam reflecting from a reflector attached to, or in proximity of, an object in the scene, or the point source may be provided by a laser attached to, or in proximity of, an object in the scene. The imager converts the degraded image into first image data signals representing the degraded image, and converts the image of the point source into second image data signals representing a point spread function. A computer of the system receives the first and second image data signals and produces third image data signals representing a recovered image of the object of the degraded image in accordance with the first and second image data signals.

The imager represents an image capturing unit having optics for capturing light having both the degraded image and the image of the point source, and separating the light representing the image of the point source from the light representing the degraded image. A CCD in the unit detects the light representing the point source image to provide the second image data signals. A digital camera having one or more CCD's detects the light representing the degraded image to convert the light into the first image data signals. An output device coupled to the computer can output the image data signals representing a recovered image to display or print the recovered image.

In another embodiment of the present invention, the imager represents a digital camera which captures a degraded image through atmospheric turbulence of a scene which includes a degraded image of a known reference object and an unknown object. The computer after receiving the first image data signals of the degraded image identifies in the first image data signals such image data signals representing the reference object. The computer produces image data signals representing a recovered image of the scene with the unknown object in accordance with the first image data signals, the image data signals representing the reference object in the first image data signals, and image data signals representing an undegraded image of the reference object. The image data signals representing the undegraded image of the reference object were captured previously, when no or minimal atmospheric turbulence was present, and stored in memory accessible by the computer. An output device coupled to the computer can output the image data signals representing a recovered image to display or print the recovered image in which the unknown object is now viewable.

BRIEF DESCRIPTION OF THE DRAWINGS

The foregoing objects, features and advantages of the invention will become more apparent from a reading of the following description in connection with the accompanying drawings in which.

DETAILED DESCRIPTION OF THE INVENTION

Figure 1A:
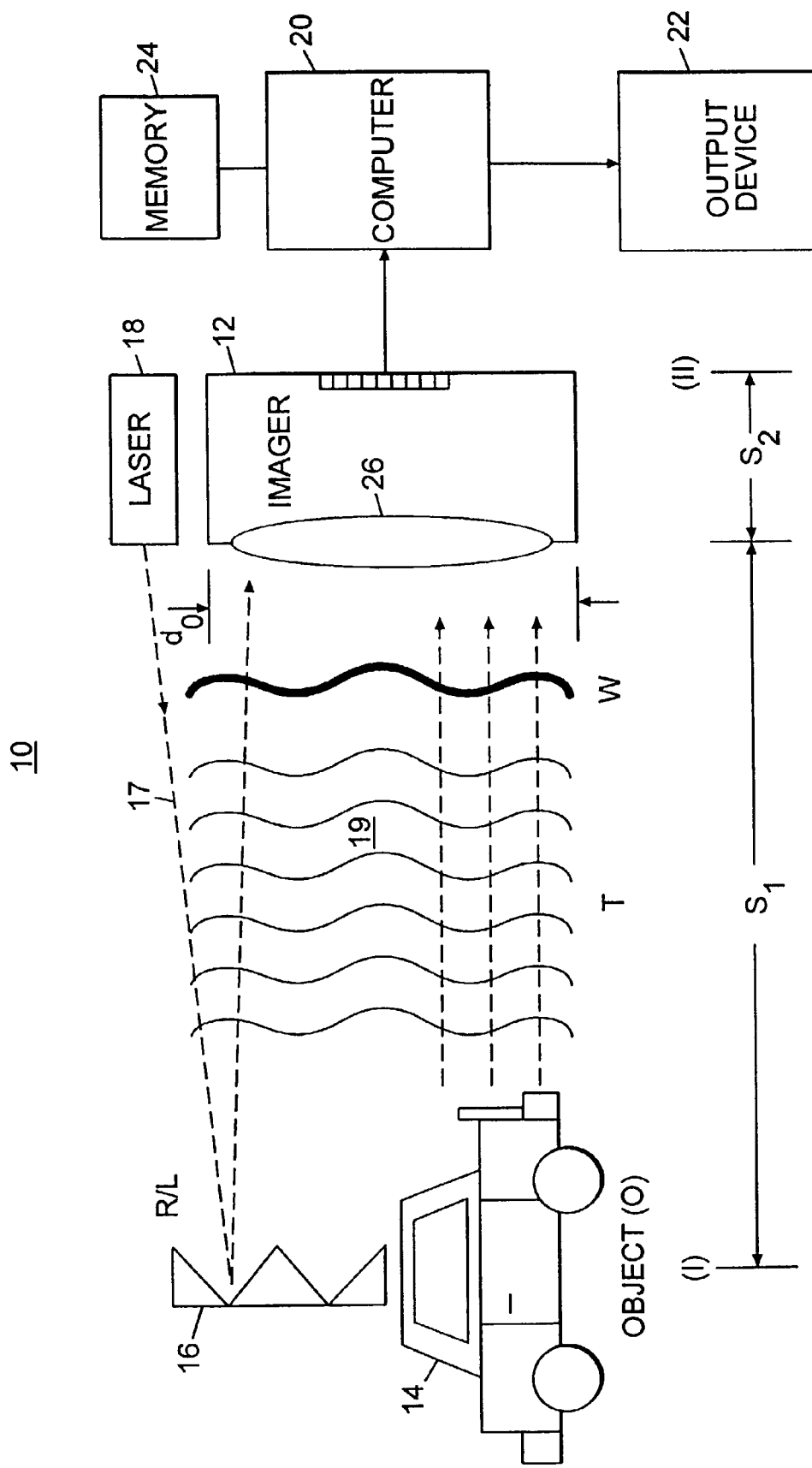
FIG. 1A is a block diagram of the system according to the present invention.

Referring to FIG. 1A, a system 10 is shown having an imager 12 for capturing an image of a scene having one or more objects 14. For purposes of illustration, a single object 14 is shown for example as a car. In proximity of object 14, or mounted thereto, is a reference point source or beacon 16 provided by an active laser, or alternatively, by a mounted retro-reflector strip, which reflects a beam 17 of light produced by laser 18 to the imager 12. Accordingly, beacon 16 is referred herein as reflector/laser (R/L). The imager 12 receives light representing the scene having both the object 14 and the point source provided by the beam 17 from R/L 16, and outputs first two-dimensional image data signals representing the degraded image of the scene including the object 14, and second two-dimensional image data signals representing the point source. The light received can be distorted by atmospheric conditions (or turbulence) 19, such as rain, snow, fog, smoke, or underwater fluctuations, such that the images captured by imager 12 are degraded or blurred. The light from the point source and the object receive the same degradation or coding by the atmospheric conditions 19 when received at imager 12, and recorded by the imager.

A computer 20, at one of its input ports, receives from imager 12 information representing the first image data signals of the scene including the object, and the second image data signals of the point source associated with the object. The computer 20 is programmed in accordance with instructions to process the first and second image signals to provide image data signals representing a recovered digital image of the captured degraded image of the object, as will be described later in connection with FIG. 2. The image data signals representing the recovered digital image are outputted to output device 22 or may be stored in memory 24. Computer 20 may be a personal computer, laptop, work station, or other microprocessor-based system. Output device 22 may be a printer or display. Memory 24 may be RAM, PCMCIA memory card, a CDROM or hard disk drive of the computer 20. When processing is not to be provided in approximately real-time, the imager 12 may have means for storing for each capture image of a scene information representing the first and second image data signals. Such storing means may include RAM on the imager 12, or files on a memory storage unit, such as a magnetic disk, optical disk (CDROM), or PCMCIA memory card. The memory storage unit may be provided to computer 20 via a corresponding input device at computer 20.

Figure 1B:
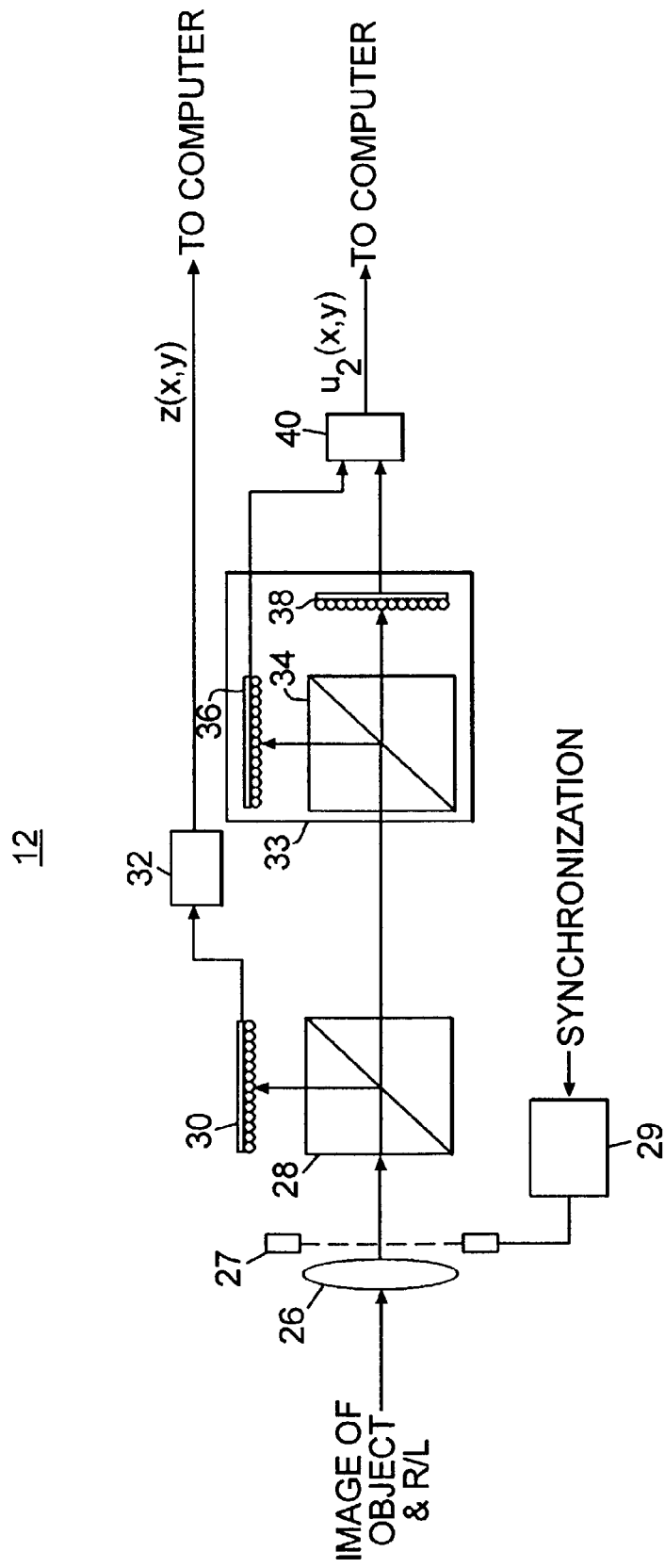
FIG. 1B is a block diagram of the image capture unit of the system of FIG. 1A.

Referring to FIG. 1B, imager 12 represents a telescopic image capture unit which receives an image of the object and R/L 16 through telescopic optics represented by lens 26. A beam splitter 28 splits the image beam from lens 26 to a two-dimensional CCD array 30 sensitive to the wavelength range associated with R/L 16 over a predefined integrated time, such 1 ms, but less than 10 ms. The CCD 30 converts the light into electrical signals which are received by image receiving circuit 32 having a buffer to temporarily store a two-dimensional array of pixels defining the second image data signals of the point source, i.e., a point spread function. Each pixel in the array may have a value, such as 0–255. The light transmitted though beam splitter 28 is received by a digital camera 33. The camera 33 may be a typical digital color camera having multiple two-dimensional CCD's for capturing different wavelength ranges of the received light over a predefined integrated time, such as 1 ms, but less than 10 ms. For example, a two-color channel camera 33 may have a beam splitter 34 for separation of the received light into different wavelength ranges such that light of one range is received by a two-dimensional CCD 36 and light of the other range is received by a two-dimensional CCD 38. Additional beam splitters and associated CCD's may be used to provide additional color channels. CCD's 36 and 38 convert the received light into signals which are received by image receiving circuit 40 having a buffer to temporarily store for each color channel a two-dimensional array of pixels defining the first image data signals of the degraded image of object 14. In the case of typical R,G,B coordinates, the first image data signals have an array of pixels for each of the color channels. Camera 33 may also be a single two-dimensional CCD camera providing a two-dimensional array of pixels having gray scale values of 8 to 32 bit, i.e., continuous tone. Preferably, camera 33 is a digital video camera. The pathlength from objective lens 26 to CCD 30 and the CCD's of camera 32 should be the same in order to form shape images of the object 14 at plane (I) at all CCD's in imager 12 (FIG. 1B is not shown to scale). Since the computer 20 processes each color channel in the same manner, the following description considers the camera 33 outputting, for each image captured of a scene, image data signals $u_2(x,y)$ representing an array of pixels having a gray scale value, or a single color channel.

Fast shuttering and synchronization of frames captured by the CCD's and their associated buffer circuits 32 and 40 is also required so that the point spread function of the imaged point source is representative of the turbulence affecting imaging of the object at plane (I). Such shuttering and synchronization should be accurate within predefined intervals, such as in the range of 1 to 10 milliseconds. For each frame, a clock cycle is controlled by a shutter which opens for the predefined interval and then closes. The recorded frames, i.e., images, from each CCD and associated buffer circuit are clocked out with a frame label to the computer, such that subsequent processing by the computer is carried out on a frame by frame basis. To achieve shuttering in imager 12 in accordance with clocking of the buffer circuits 32 and 40 and the computer's receiving of images from such circuits, a shutter 27 is shown in FIG. 1B after objective lens 26. Shutter 27 may be controlled by shutter control circuit 29 in accordance with a synchronization signal received from computer 20.

The following theory mathematically describes the degraded image of the first image data signals, $u_2(x,y)$, taken by imager 12 of the scene having object 14, where the undegraded image of the object in plane (I) is represented by $u_1(x,y)$ and the point spread function of the associated second image data signals is represented by $z(x,y)$. The degraded image $u_2(x,y)$ may be mathematically described by $$u_2(x,y) = u_1(x,y) * z(x,y) \quad (1)$$

in which the two-dimensional convolution over (x,y) is denoted by the asterisk (*).

Figure 2:
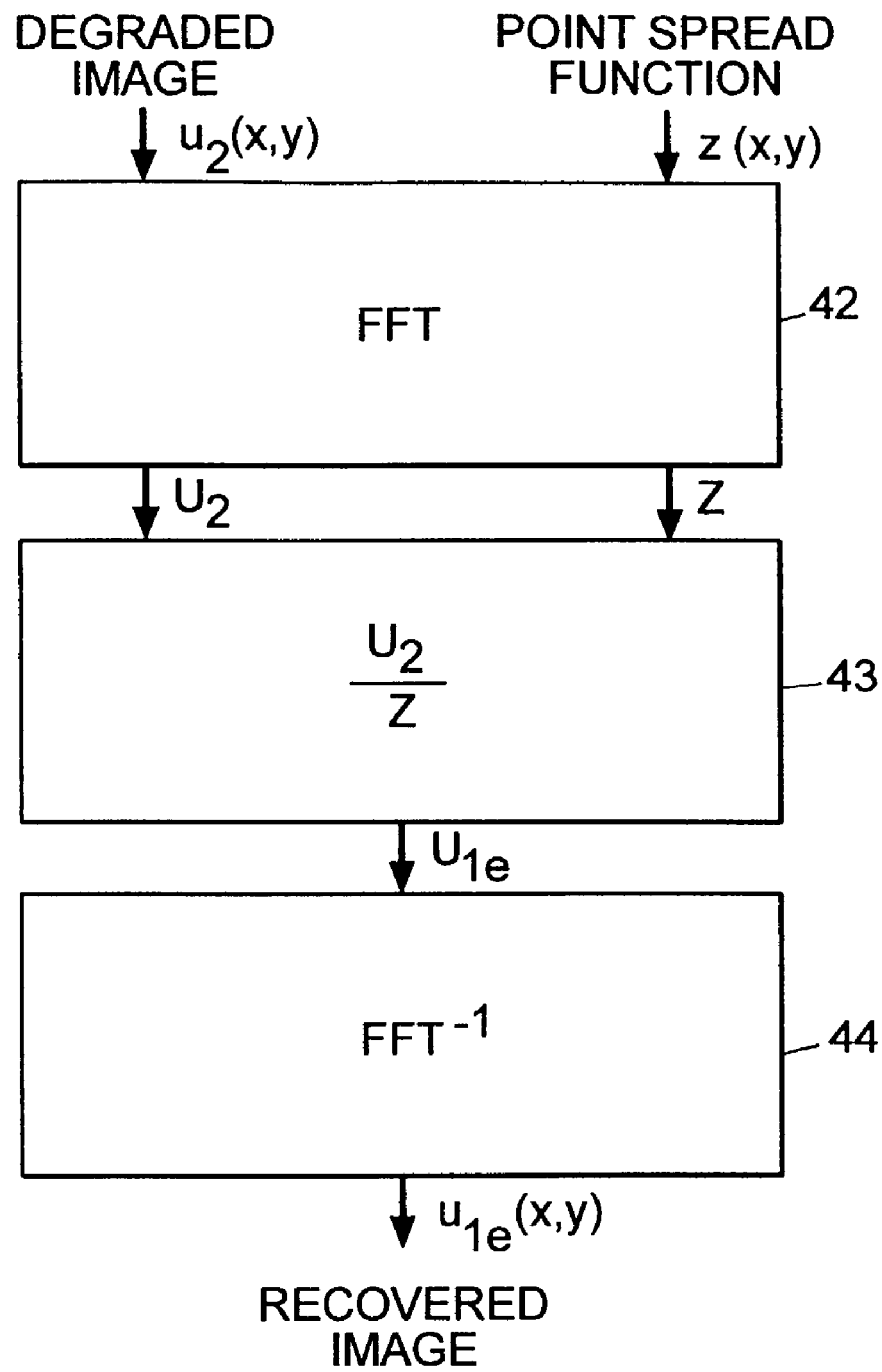
FIG. 2 is a flow chart showing the programming and operation of the computer of FIG. 1A.

Referring to FIG. 2, a flow chart of the programming of computer 12 for recovering the captured degraded image for system 10 is shown. In the following description, the two-dimensional Fourier transforms of spatial functions are indicated by their capital letters. For example, the Fourier transform of $u_1(x,y)$ is $U_1(f_x,f_y)$ and the inverse Fourier transform of $U_1(f_x,f_y)$ is $u_1(x,y)$, and their transform pair is:

$$U_1(f_x, f_y) = \int_{-\infty}^{\infty}\int u_1(x, y)\exp[-i2\pi(f_x x + f_y y)]dx\,dy, \quad (2)$$

$$u_1(x, y) = \int_{-\infty}^{\infty}\int U_1(f_x, f_y)\exp[i2\pi(f_x x + f_y y)]df_x\,df_y. \quad (3)$$

Similarly, the Fourier transform pairs for the point spread function is $z(x,y)$ and $Z(f_x,f_y)$, and for the degraded image is $u_2(x,y)$ and $U_2(f_x,f_y)$, respectively.

Computer 20 first performs an FFT (Fast Fourier Transform) on the degraded image $u_2(x,y)$ and $z(x,y)$ to provide $U_2(f_x,f_y)$ and $Z(f_x,f_y)$, respectively (step 42). For purposes of illustration, only their associated capital letters are shown in FIG. 2. Next, $U_2(f_x,f_y)$ is divided by $Z(f_x,f_y)$ to provide $U_1(f_x,f_y)$ (step 43). An estimate of $U_1(f_x,f_y)$ denoted by $U_{1e}(f_x,f_y)$ may be provided by the Wiener-Helstrom expression:

$$U_{1e} = U_2 \frac{Z^*}{ZZ^* + \frac{1}{256}}. \quad (4)$$

in which $Z(f_x,f_y)$ is denoted by Z, its complex-conjugate is indicated by the superscripted asterisk, i.e., $Z^*$, and $ZZ^*$ is the product Z and $Z^*$. The expression of Equation (4) is described, for example, in C. W. Helstrom, Journal of the Optical Society of America, Vol. 57, p. 297 (1967). Application of this expression is used in the earlier cited U.S. Pat. No. 5,453,844 for secure transmission of coded images. As described in U.S. Pat. No. 5,453,844, the inverse filtering operation of Equation (4) can provide good results when the complex-plane of zeros of $Z(f_x,f_y)$ are discrete. As shown for example in FIGS. 4A and 4B, a point spread function of atmospheric turbulence $z(x,y)$ contains irregular spaced delta-like points, providing a corresponding Fourier transform $Z(f_x,f_y)$ which contains discrete zeros. Thus for atmospheric turbulence, the presence of these discrete zeros enables good image recovery. However, other methods of inverse filtering may also be used.

An $FFT^{-1}$ (inverse Fast Fourier Transform) is then performed on $U_{1e}(f_x,f_y)$ to provide $u_{1e}(x,y)$ (step 44). The two dimensional FFT and $FFT^{-1}$ may be provided by software in the computer or by hardware, such as integrated chips, in the computer providing such processing. The resulting $u_{1e}(x,y)$ represents the image data signals of the recovered image, which may then be outputted to the output device 22 for viewing or stored in memory 24. A computer can provide frame-by-frame processing of each frame received from imager 12 of a degraded image $u_2(x,y)$ with an associated point spread function $z(x,y)$ for near real-time image recovery.

Figure 3A:
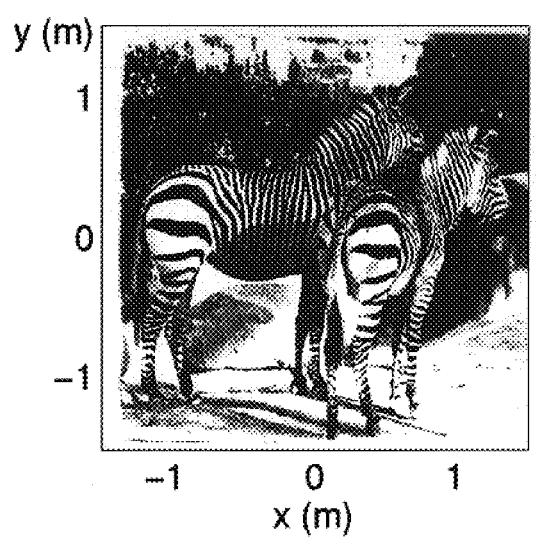
FIGS. 3A and 3B are examples of two undegraded images taken without atmospheric turbulence present to illustrate the operation of the system of FIG. 1A.
Figure 3B:
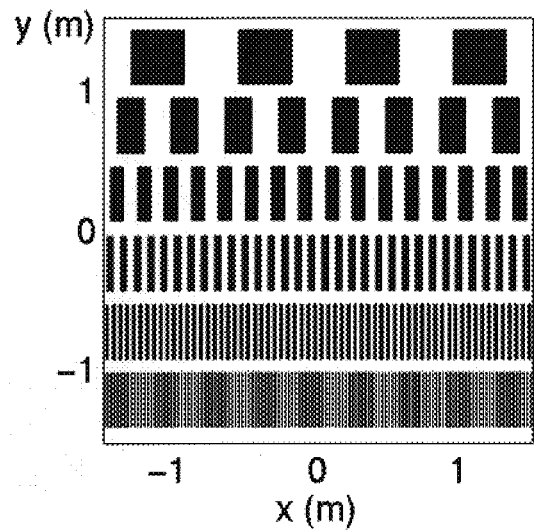

Referring to FIGS. 3A–3B, 4A–4B, and 5A–5B, two examples of the operation of the system 10 will be described. In these examples, the object 14 (O) lies in plane (I) and has dimensions $L_1$ by $L_1$. The wavefront from the object 14 is propagated over a horizontal path distance, $s_1$, to the imager 12. The imaging objective 26 of imager 12 has a diameter $d_o$ and a focal length F. Imager 12 records light representing the blurred image in plane (II) and light in plane (II) representing the reference point source captured at the same time. In a first example, FIG. 3A shows two zebras with the frame size of $L_1$ equal to 3 m, and in a second example, FIG. 3B shows a resolution chart also with $L_1$ equal to 3 m. In this chart, reading from the top to bottom, there are 4 periods at 75 cm spacings, 8 periods at 37.5 cm, 16 at 18.8 cm, 32 at 9.4 cm, 64 at 4.7 cm, and 128 at 2.3 cm. This chart may be used for calibration of the system 10 to determine the resolution in poor seeing conditions, such as caused by atmospheric turbulence. In each of the example, distance $s_1$=1,000 m, and imager 12 has a telescope diameter $d_O$=30 cm and a focal length F=90 cm. The corresponding image size is $L_2$=3.33 mm in plane (II). In these examples, the function $U_2(f_x,f_y)$ equal to $U_1(f_x,f_y)Z(f_x,f_y)$ with $u_2(x,y)$ truncated at 8 bits, and $U_1(f_x,f_y)$ is estimated by $U_{1e}(f_x,f_y)$ in accordance with the Wiener-Helstrom expression of Equation (4).

Figure 4B:
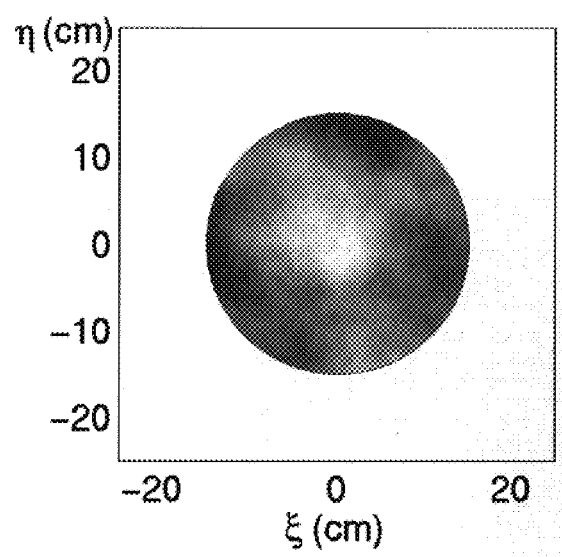
FIG. 4B is a Fourier transform of the point spread function of FIG. 4A at the coordinates $\zeta,\eta$ at the objective lens of the system of FIG. 1A.
Figure 4A:
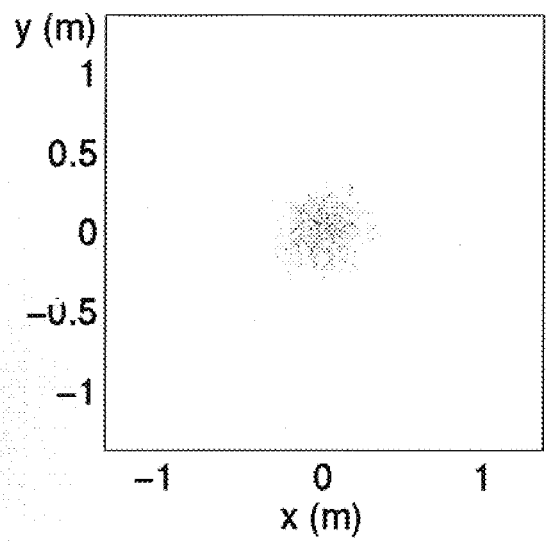
FIG. 4A is an example of the image of a point source taken through atmospheric turbulence (imaging time <1 ms) to provide a point spread function.

To simulate atmospheric turbulence of the images of FIGS. 3A and 3B on a computer, the software program Skylight, version 1.3, produced by Weinklesoft of Pasadena, Calif. was used. The Skylight software generates random arrays of wavefront phase screens possessing statistics that follow Kolmogorov turbulence theory. Detailed, time-evolving, three-dimensional atmospheric turbulence models may be generated by creating multiple simultaneous screens, each with its own distance from the observer and wind velocity. From the turbulence function of the Skylight software for a short-time event (τ<1 millisecond), a speckle pattern or point-spread function z(x,y) and corresponding the pupil function $Z(f_x,f_y)$ shown in FIGS. 4A and 4B, respectively, were produced to simulate atmospheric turbulence. FIG. 4B shows the distribution of light at the aperture of the 30 cm-telescope, i.e., $Z(f_x,f_y)$.

The degree of atmospheric turbulence may be characterized by Fried's parameter, $r_O$, which ranges from below 1 cm to over 20 cm for visible light, λ=0.5 μm, as described in articles by D. L Fried, Journal of the Optical Society of America, Vol. 55, p. 11 (1965) and Vol. 56, p. 1380 (1966). The parameter $r_O$ is the aperture size within which the atmospheric turbulence has a mean-square phase fluctuation of one radian squared.

Figure 5A:
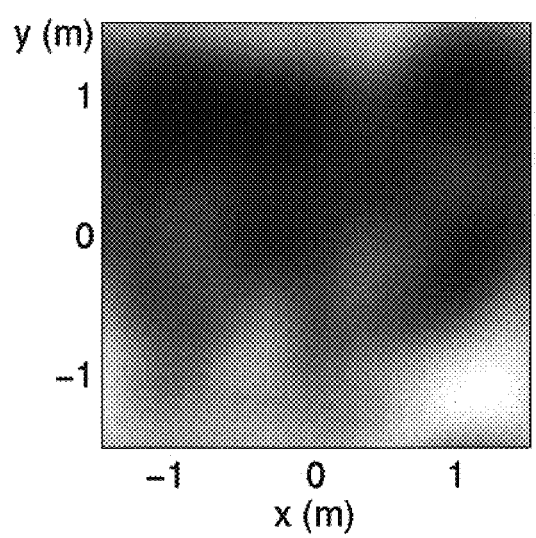
FIG. 5A is an example of a simulated degraded image of the image of FIG. 3A.
Figure 5B:
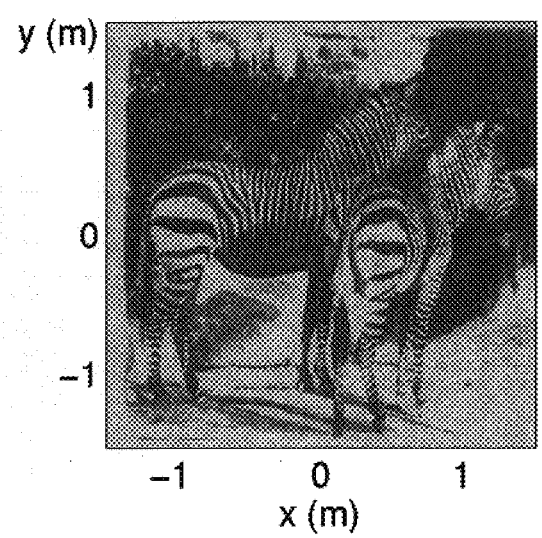
FIG. 5B is an example of a recovered image of the degraded image of FIG. 5A in accordance with the system of FIG. 1A.

In the first example of FIG. 3A, the simulated blurred image received at plane (II) is shown in FIG. 5A with $r_O$=0.5 cm, a poor seeing condition. It is labeled in object plane coordinates, and is blurred beyond distinction. Image recovery with the Wiener-Helstrom form of inverse filter (FFT$^{-1}$) provides the clear image shown in FIG. 5B.

Figure 6A:
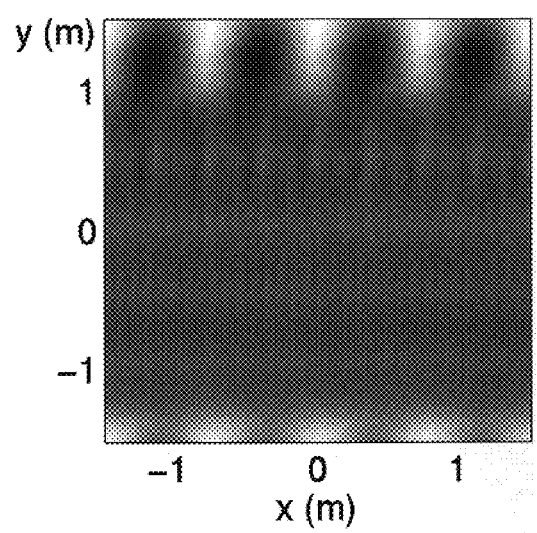
FIG. 6A is an example of a simulated degraded image of the image of FIG. 3B.
Figure 6B:
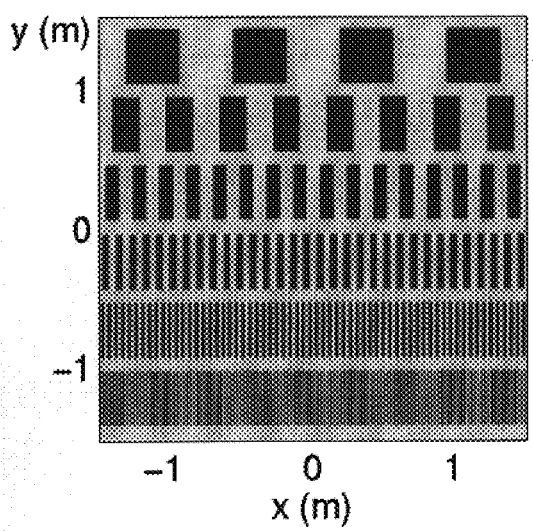
FIG. 6B is an example of a recovered image of the degraded image of FIG. 6A in accordance with the system of FIG. 1A.
Figure 6C:
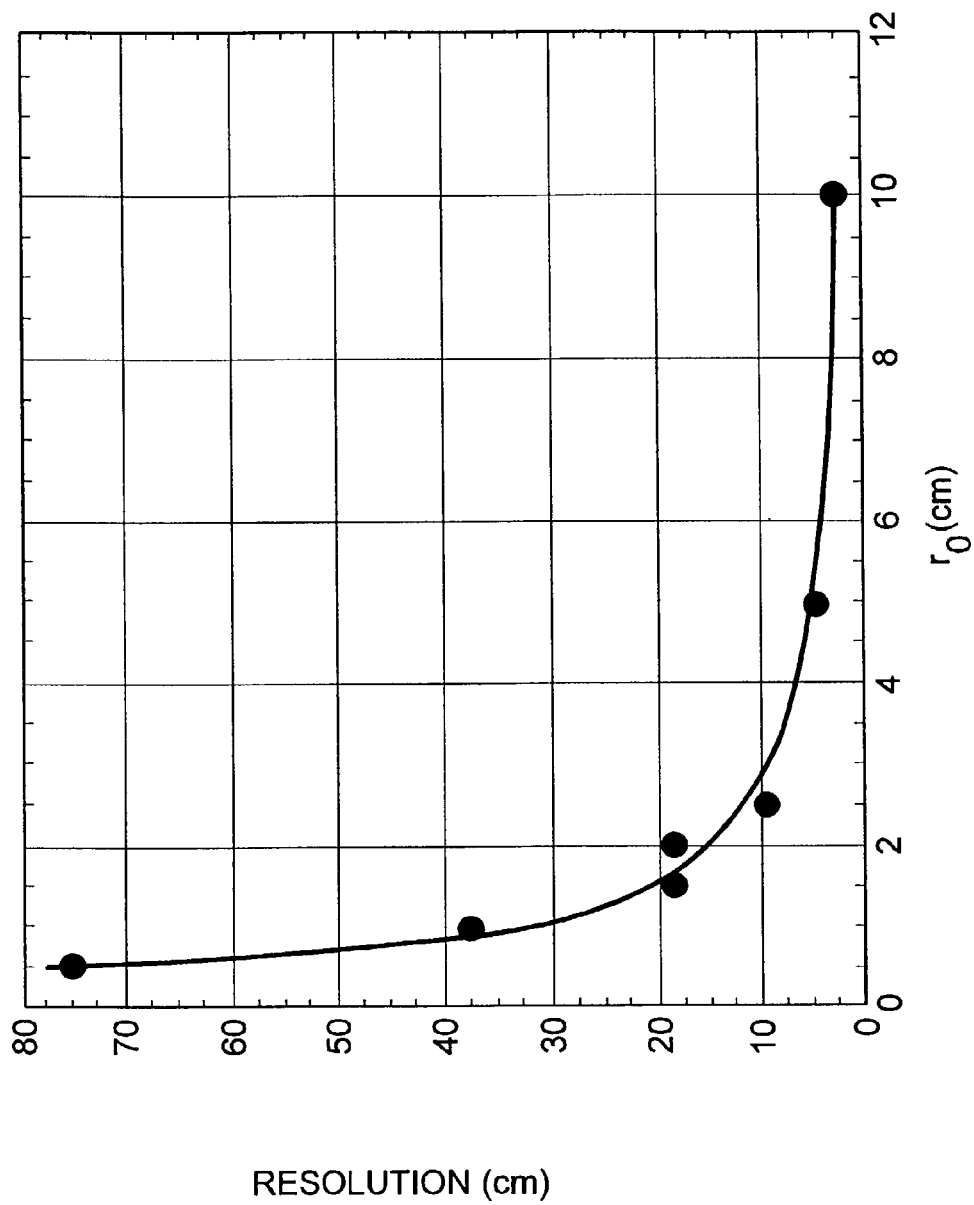
FIG. 6C is a chart illustrating the degradation of the image of FIG. 3B verses $r_0$, the aperture size where the atmospheric turbulence has a mean square phase fluctuation of one radian square, for the system of FIG. 1A.

In the second example of FIG. 3B, the simulated blurred test chart is shown in FIG. 6A, in which only the top line is distinguishable. This is a period of 75 cm in plane (I). Again, after processing, the resolution chart is clearly seen in FIG. 6B, in which the bottom row having a resolution period of 2.3 cm is clearly visible. Although, 8-bit processing was used in these examples, other number of bit processing, such as 12 to 32 bit, may also be used.

Figure 7:
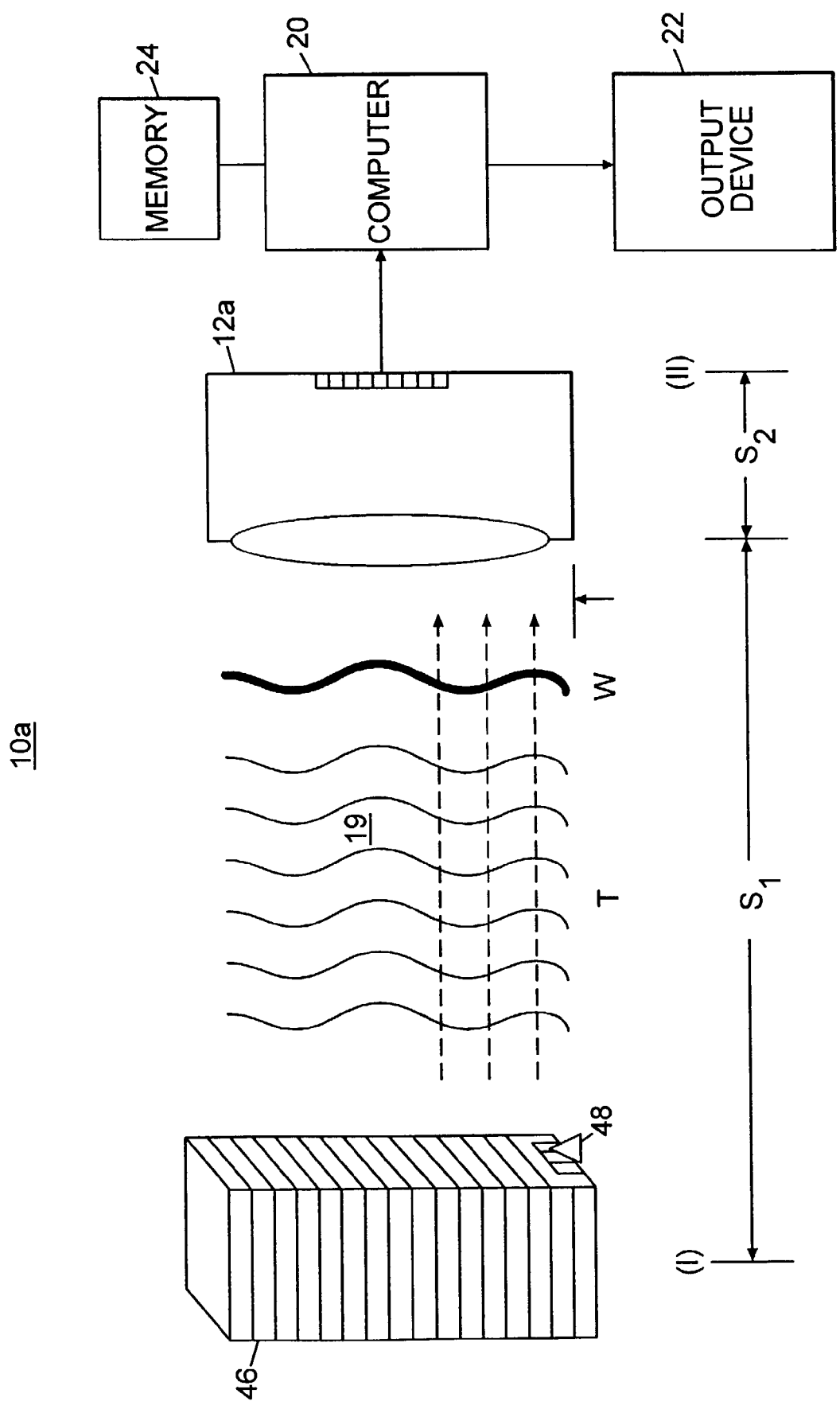
FIG. 7 is a block diagram of the system according to another embodiment of the present invention.

To illustrate the need for system 10, the resolution in the blurred image as a function of the seeing cell size, i.e., Fried's parameter $r_O$, based on the test chart of FIG. 3B is plotted in the graph of FIG. 7 for the resolution period of the chart versus $r_O$ for the 1 km path length ($s_1$). The performance of system 10 is best illustrated by comparing FIG. 6A and FIG. 6B in which an improved resolution of about 32 times (5 lines on the resolution test chart) is shown.

Although a single point source is described in system 10, multiple point sources may be included for different objects in different parts of the imaged scene. Imager 12a then captures an image having multiple point sources in which each imaged point source provides image data signals of a different point spread function z(x,y). For the image data signals of each different point spread function, the computer 20 processes the degraded image $u_2$(x,y) in segments in which each segment is associated with a point spread function of an object in or near the segment. The resulting recovered image of each segment may form a composite image of the entire degraded image. This use of multiple point sources can provide improved image recovery over a much wider angle of view. For example, the imaged object may be segmented into sectors or regions with a separate point source for each object sector on the order of size of an isoplanatic cell.

Referring to FIG. 7, a system 10a of another embodiment of the present invention is shown. System 10a has an imager 12a for capturing an image of a scene having a known reference object 46 and an unknown object 48. For purposes of illustration, reference object 46 is shown as a building and the unknown object 48 is shown as a triangle. For example, the unknown object could be a person or car in front of the building. In this system, the object 46 is used as the reference, rather than a point source, as in system 10. Imager 12a represents an image capturing unit such as typical digital camera, preferably a digital color video camera, having telescopic optics. Imager 12a receives light at plane (II) from the scene having the reference object 46 and the unknown object 48 at plane (I). When atmospheric turbulence 19 is present, the camera thus captures a degraded image of the scene having reference and unknown objects 46 and 48. The computer 20, output device 22 and memory 24 in system 10a may be the same as described in system 10. For each color channel of a captured image, computer 20 receives from imager 12 two-dimensional digital image signals, $u_2$(x,y), representing the captured degraded image of reference and unknown objects 46 and 48, and processes the image in accordance with programmed instructions to provide digital image signals representing a recovery of the degraded image of the scene including the unknown object 48, as will be described later in connection with FIG. 8. The digital image signals representing the recovery image may be outputted to output device 22 or stored in memory 24. The imager 12a may alternatively be a digital camera providing $u_2$(x,y) as a gray scale, continuous tone, image. Digital image signals $u_2$(x,y) represent a single frame or image captured by imager 12a.

Prior to imaging of a degraded image, the reference object is imaged by imager 12a when little or no atmospheric turbulence is present to provide digital image signals $u_1^{(r)}$(x,y) representing an undegraded image of the reference object 46 in each color channel. If imager 12a is a digital camera providing gray scale, continuous tone, imaging, $u_1^{(r)}$(x,y) represents a stored gray scale, continuous tone, image of the reference object. Digital image signals $u_1^{(r)}$(x,y) are provided to computer 20 which stores such them in memory 24 for later use in image recovery.

After receiving $u_2$(x,y) from imager 12a, the computer 20 identifies in $u_2$(x,y) the part of the degraded image representing the reference object 46 by using pattern recognition/matching software operating on the computer which can detect boundaries in the image associated with the reference object in the image. Alternatively, or in combination with such pattern recognition software, the imager 12 may be fixed with respect to the reference object in which the location (i.e., pixels) of an image of the reference object in each captured image is known and stored as location information in memory of the computer, such that the digital image signals associated with the reference object can be ascertained based on the location information. To obtain the location information (or the pattern to be associated with the reference object by the pattern recognition/matching software), the reference object should be imaged by imager 12a when little or no atmospheric turbulence is present between the reference object and imager 12a, such that an operator interfacing with computer 20 or the pattern recognition software can identify the reference object 46 in the image. This may occur at the same time as digital image signals $u_1^{(r)}$(x,y) are obtained.

Both the unknown object $u_1$(x,y) and a known reference object $u_1^{(r)}$(x,y) are degraded simultaneously to provide $u_2$(x,y) and $u_2^{(r)}$(x,y), respectively. Thus, both the unknown object and known reference object experience the same degradation point spread function, z(x,y) or its Fourier transform $Z(f_x,f_y)$ due to atmospheric turbulence 19.

In Fourier transform space, the degraded images of the unknown object and the reference, $U_2(f_x,f_y)$ and $U_2^{(r)}(f_x,f_y)$, respectively, are $$U_2 = U_1 Z \qquad (5)$$

and $$U_2^{(r)} = U_1^{(r)} Z. \qquad (6)$$

Figure 8:
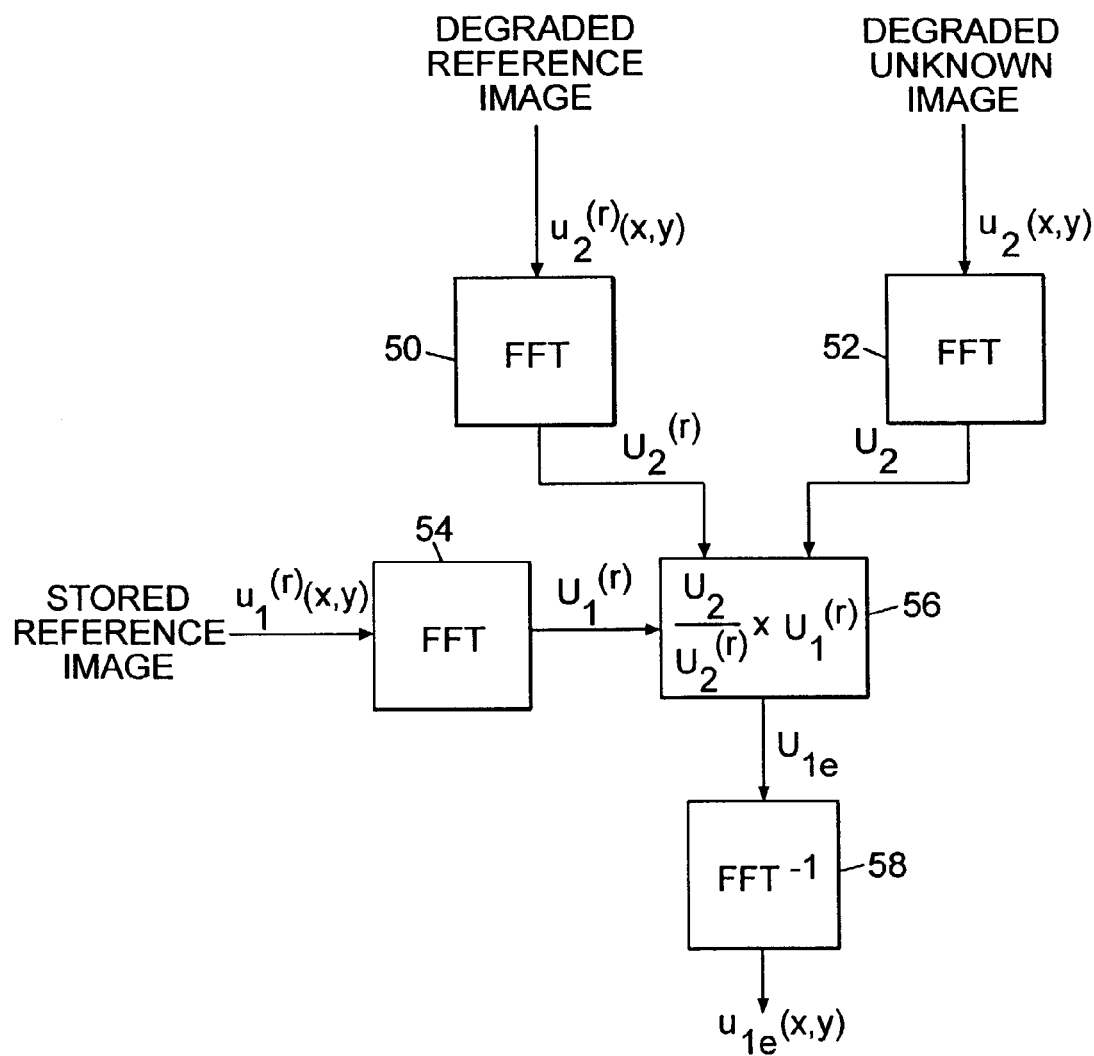
FIG. 8 is a flow chart showing the programming and operation of the computer in the system of FIG. 7.

Only the associated capital letters of the Fourier transform of spatial functions are shown in Equations 5–6 and in FIG. 8.

Referring to FIG. 8, a flow chart of the programming of computer 12 for recovering the captured degraded image for system 10a is shown. Computer 12 first determines the FFT of the degraded reference image $u_2^{(r)}(x,y)$, the degraded unknown object $u_2(x,y)$, and the stored reference image $u_1^{(r)}(x,y)$, to provide their Fourier transforms $U_2^{(r)}(f_x,f_y)$, $U_2(f_x,f_y)$ and $U_1^{(r)}(f_x,f_y)$, respectively (steps 50, 52 and 54). The Fourier transform of $u_1^{(r)}(x,y)$ may be determined prior to imaging of the degraded image and stored in memory 24 and then accessed by computer 20, rather than being determined at step 54. At step 56, $U_1(f_x,f_y)$ is determined by dividing $U_2(f_x,f_y)$ by $U_2^{(r)}(f_x,f_y)$, and then multiplying the result by $U_1^{(r)}(f_x,f_y)$. An adequate estimate of $U_1(f_x,f_y)$ may be provided by $U_{1e}(f_x,f_y)$ as follows:

$$U_{1e} = \frac{(U_1 Z) U_1^{(r)}}{U_1^{(r)} Z}. \qquad (7)$$

An inverse FFT (FFT$^{-1}$) of $U_{1e}(f_x,f_y)$ yields the recovered image $$u_{1e}(x,y) = u_1(x,y). \qquad (8)$$

The above description of system 10a refers to processing a signal color channel of gray scale image $u_2(x,y)$. Each color channel provided by imager 12a of an image can be processed in the same manner as for a single color channel, in which $u_1^{(r)}(x,y)$ represents a stored reference image for each color channel. For example, in the red color channel, $u_2(x,y)$ would represent the pixel array of this channel, which is processed by computer 20 in system 10a using $u_1^{(r)}(x,y)$ of the reference object in the same color channel to provide a recovered image $u_{1e}(x,y)$ in the red color channel. A color representation of the recovered image for $u_{1e}(x,y)$ in each color channel may be displayed or printed on output device 22 or stored in memory 24. As in system 10, the computer 20 can provide frame-by-frame processing of each frame of a blurred degraded image, $u_2(x,y)$, provided by the imager 12a for near real-time image recovery.

Figure 9:
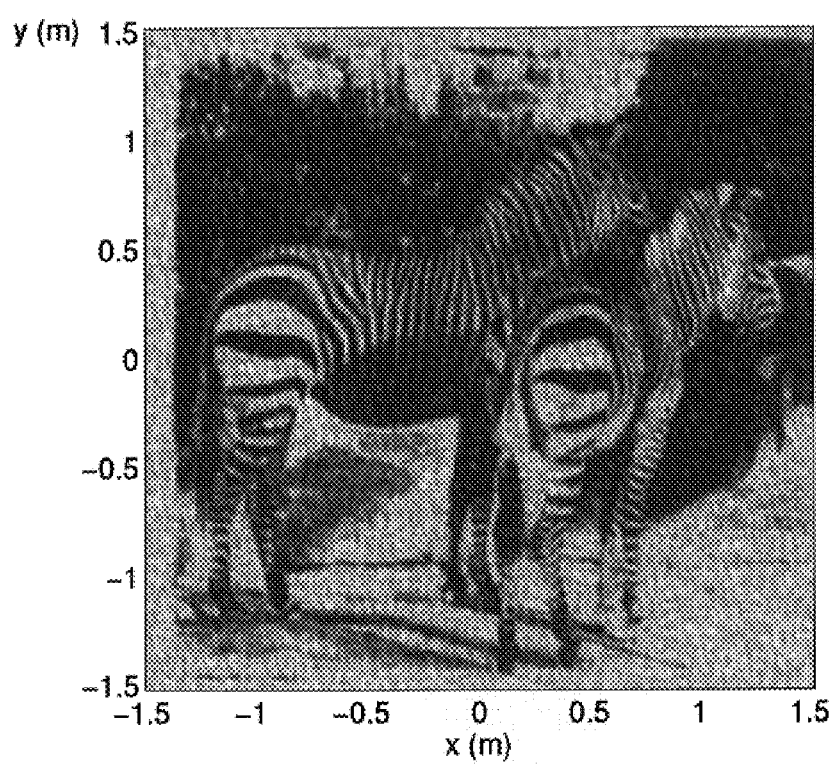
FIG. 9 is an example of a recovered image of the degraded image of FIG. 5A in accordance with the present invention for the system of FIG. 7.

For example, using the Skylight software described earlier, in which the zebra image of FIG. 3A was degraded to provide the degraded image of FIG. 5A in highly turbulent conditions of $r_O$=0.5 cm, a humming bird (not shown) represents the reference object, similarly degraded to that of zebras (and other objects in the scene, such as trees) which represent the unknown object. Using system 10a, the recovered image of the zebras is shown in FIG. 9. Eight bit processing is used in the calculations. However, other bit processing, such as 12 to 32 bit, may provide higher image contrast.

In the alternative, imager 12a may be provided by two cameras in plane (II) for imaging the reference object and unknown object, respectively. Within the 1 millisecond time interval, two separate blurred images may then be recorded by the cameras, one a known reference $u_2^{(r)}(x,y)$ and the other an unknown object $u_2(x,y)$.

Although a single reference is described in system 10a, multiple reference objects may be included for different parts of the imaged scene. Imager 12a then captures an image having multiple references in which each imaged reference is identified by computer 20 to provide image data signals. For each imaged reference, the computer 20 processes the degraded image $u_2(x,y)$ in accordance with the data signals of the imaged reference and a stored undegraded image of the reference to provide a recovered image. The operator may review each of the recovered images on the output device 22, and then select the one which best recovers the image, or a region of interest in the image.

An additional feature of system 10 is that the point spread function z(x,y) for a captured image may be stored in a database of the memory 34 to measure the turbulence when each degraded image is recovered. Further, in system 10a, the point spread function z(x,y) may be determined by dividing by $U_2(f_x,f_y)$ by $U_1^{(r)}(f_x,f_y)$ to obtain $Z(f_x,f_y)$, and then determining the inverse Fourier transform (FFT$^{-1}$) to provide z(x,y). The resulting z(x,y) may similarly be stored in a database of the memory 24 by computer 20.

In addition to imaging through atmospheric turbulence, systems 10 and 10a are applicable to imaging through other media, such as tissue, in which images are degraded by speckle. Further, imaging in systems 10 and 10a by imager 12 and 12a, respectively, may be other than for visible light imaging, such as ultrasonic, X-ray, or other electromagnetic radiation, e.g., submillimeter wave, imaging.

Systems 10 and 10a can recover images of high quality from degraded images using readily available components, such as computer systems, optics, and digital cameras, which are inexpensive in contrast with prior art image correction using adaptive optics.

From the foregoing description, it will be apparent that there has been provided an improved system for recovering degraded images using a reference point source or object. Variations and modifications in the herein described system in accordance with the invention will undoubtedly suggest themselves to those skilled in the art. Accordingly, the foregoing description should be taken as illustrative and not in a limiting sense.

What is claimed is:

1. A system for recovering images of high quality from degraded images comprising:

means for capturing an image to provide first image data signals representing a degraded image of a scene having at least one object and second image data signals representing a point spread function of an image of a point source associated in said scene with said object in the degraded image; and means for producing third image data signals representing a recovered image of said object from said degraded image in accordance with said first image data signals and said second image data signals, wherein said second image data signals represent a point source function capable of providing a corresponding Fourier transform having discrete zeros.

2. A system for recovering degraded images comprising:

means for capturing an image to provide first image data signals representing a degraded image of a scene having an unknown object and second image data signals representing a degraded image of a reference object in the scene of the degraded image;

means for storing third image data signals representing an undegraded image of the reference; and means for producing fourth image data signals representing a recovered image from the degraded image in accordance with said first image data signals, said second image data signals, and said stored third image data signals.

3. The system according to claim 2 wherein said capturing means comprises:

means for receiving light representing an image having the degraded image of the unknown object and the reference object; and means for detecting said light representing said image in accordance with said received light to provide said first and second image data signals.

4. The system according to claim 2 wherein said capturing means comprises a digital camera.

5. The system according to claim 2 wherein said system further comprises a computer coupled to said storing means for enabling said producing means.

6. A method for recovering degraded images comprising:
    capturing an image to provide first image data signals representing a degraded image of a scene having an unknown object and second image data signals representing a degraded image of a reference object in the scene of the degraded image;
    storing third image data signals representing an undegraded image of the reference; and
    producing fourth image data signals representing a recovered image from the degraded image in accordance with said first image data signals, said second image data signals, and said stored third image data signals.

7. The system according to claim 2 wherein said first and second image data signals represent separate signals at said producing means.

8. The method according to claim 6 wherein said first and second image data signals represent separate signals at said producing means.

9. The method according to claim 6 wherein said capturing comprises:
    receiving light representing an image having the degraded image of the unknown object and the reference object; and
    detecting said light representing said image in accordance with said received light to provide said first and second image data signals.

* * * * *